United States Patent [19]

Nandu et al.

[11] Patent Number: 5,260,000
[45] Date of Patent: Nov. 9, 1993

[54] PROCESS FOR MAKING SILICONE CONTAINING HYDROGEL LENSES

[75] Inventors: Mahendra P. Nandu, Rochester; Rajan S. Bawa, Fairport; Yu-Chin Lai, Pittsford, all of N.Y.

[73] Assignee: Bausch & Lomb Incorporated, Rochester, N.Y.

[21] Appl. No.: 924,214

[22] Filed: Aug. 3, 1992

[51] Int. Cl.$^5$ .............................................. B29D 11/00
[52] U.S. Cl. ..................................... 264/2.1; 264/2.6; 264/2.7
[58] Field of Search .................... 264/2.1, 2.2, 2.6, 2.7

[56] References Cited

U.S. PATENT DOCUMENTS

| | | | |
|---|---|---|---|
| 3,361,858 | 1/1968 | Wichterle | 264/2.2 |
| 3,408,429 | 10/1968 | Wichterle | 264/2.1 |
| 3,496,254 | 2/1970 | Wichterle | 264/2.1 |
| 3,660,545 | 5/1972 | Wichterle | 264/2.1 |
| 3,699,089 | 10/1972 | Wichterle | 260/86.1 |
| 4,113,224 | 9/1978 | Clark et al. | 249/105 |
| 4,136,250 | 1/1979 | Mueller et al. | 528/29 |
| 4,153,641 | 5/1979 | Deichert et al. | 260/827 |
| 4,197,266 | 4/1980 | Clark et al. | 264/2.7 |
| 4,347,198 | 8/1982 | Ohkada et al. | 264/2.3 |
| 4,495,313 | 1/1985 | Larsen | 523/106 |
| 4,555,372 | 11/1985 | Kunzler et al. | 264/2.1 |
| 4,568,501 | 2/1986 | Wichterle | 264/2.1 |
| 4,680,336 | 7/1987 | Larsen et al. | 524/548 |
| 4,740,533 | 4/1988 | Su et al. | 523/106 |
| 4,889,664 | 12/1989 | Kindt-Larsen et al. | 264/2.6 |
| 4,910,277 | 3/1990 | Bambury et al. | 526/260 |
| 5,034,461 | 7/1991 | Lai et al. | 525/100 |
| 5,070,215 | 12/1991 | Bambury et al. | 556/418 |
| 5,077,335 | 12/1991 | Schwabe et al. | 264/2.6 |

*Primary Examiner*—James Lowe
*Attorney, Agent, or Firm*—John E. Thomas; Craig E. Larson

[57] ABSTRACT

A process for preparing silicone hydrogel contact lenses where machining operations are employed to produce a lens having a desired final shape. The silicone hydrogel contact lenses are prepared by:

providing a monomeric mixture comprising a silicone-containing monomer, a hydrophilic monomer and an organic diluent;

charging the mixture to a mold and curing the formulation in the mold to obtain a shaped article;

removing organic diluent from the shaped article to improve machineability of the article; and machining the shaped article to obtain a contact lens having a desired configuration.

20 Claims, No Drawings

PROCESS FOR MAKING SILICONE CONTAINING HYDROGEL LENSES

BACKGROUND OF THE INVENTION

The present invention relates to an improved process for making silicone hydrogel lenses.

Hydrogels represent a desirable class of materials for contact lenses. A hydrogel is a hydrated cross-linked polymeric system that contains water in an equilibrium state. Hydrogel lenses offer relatively high oxygen permeability as well as desirable biocompatibility and comfort.

Conventional hydrogel lenses are prepared from monomeric mixtures predominantly containing hydrophilic monomers such as 2-hydroxyethyl methacrylate or N-vinyl pyrrolidone. Oxygen permeability of these conventional hydrogel materials relates to the water content of the materials. More recently, it has been desired to increase the oxygen permeability of hydrogel lenses by employing silicone-containing monomers in the hydrogel formulations since silicone based materials have higher oxygen permeability than water. Silicone hydrogels (i.e., hydrogels containing silicone) are usually prepared by polymerizing a mixture containing at least one silicone-containing monomer and at least one hydrophilic monomer. Either the silicone-containing monomer or the hydrophilic monomer may function as a crosslinking agent (a crosslinker being defined as a monomer having multiple polymerizable functionalities) or a separate crosslinker may be employed.

Various processes are known for curing a monomeric mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. Curing of the monomeric mixture is often followed by a machining operation in order to provide a contact lens having a desired final configuration.

According to several known techniques for manufacturing contact lenses, the casting process may yield a shaped article having the desired posterior and anterior lens surfaces. For example, in static casting processes, a monomeric mixture can be charged to a mold comprising a first mold section including a surface for forming a desired anterior lens surface and a second mold section including a surface for forming a desired posterior lens surface. In spincasting processes, the monomeric mixture can be charged to an open mold having a surface for forming a desired anterior lens surface, and a desired posterior lens surface is formed from rotation of the mold. However, machining operations, subsequent to the curing of the article, may still be necessary to provide a contact lens more suitable for placement on the eye. Such machining operations include lathe cutting the lens to obtain a desired edge, buffing the lens edge or polishing the lens edge or surface.

In other known manufacturing techniques, the casting process may yield a shaped article which does not have the desired anterior and/or posterior lens surfaces. Accordingly, the casting process is followed by a machining operation to form a desired lens surface. As an example, U.S. Pat. No. 4,555,732 discloses a process where an excess of a monomeric mixture is cured by spincasting in a mold to form a shaped article having an anterior lens surface and a relatively large thickness, and the posterior surface of the cured spincast article is subsequently lathe cut to provide a contact lens having the desired thickness and posterior lens surface. Further machining operations may follow the lathe cutting of the lens surface, such as the previously described edge finishing operations.

However, difficulties have been encountered in attempts to employ such methods which involve machining operations in the production of silicone hydrogel contact lenses. For example, silicone hydrogel articles generally are more difficult to machine than conventional hydrogel articles, as hydrogels prepared from silicone-containing monomers tend to be softer and more rubbery than hydrogels prepared from only the conventional monomers, especially when cast with a diluent.

SUMMARY OF THE INVENTION

The present invention provides a process for preparing silicone hydrogel contact lenses where machining operations are employed to produce a lens having a desired final shape. The process comprises:
 providing a monomeric mixture comprising a silicone-containing monomer, a hydrophilic monomer and an organic diluent;
 charging the mixture to a mold and curing the mixture in the mold to obtain a shaped article;
 removing organic diluent from the shaped article to improve machineability of the article; and
 machining the shaped article to obtain a contact lens having a desired configuration.

DETAILED DESCRIPTION OF THE INVENTION

Any known silicone hydrogel formulation including at least one silicone-containing monomer and at least one hydrophilic monomer may be used in the process of this invention, as will be apparent to one skilled in the art. The monomers may be added to the monomeric mixture from which a shaped article is obtained as monomers or prepolymers. Thus, it is understood that the terms "silicone-containing monomers" and "hydrophilic monomers" include prepolymers. Examples of silicone-containing monomers may be found in U.S. Pat. Nos. 4,136,250; 4,153,641; 4,740,533; 5,034,461; and 5,070,215.

Further examples of suitable silicone-containing monomers are bulky polysiloxanylalkyl (meth)acrylic monomers represented by formula (I):

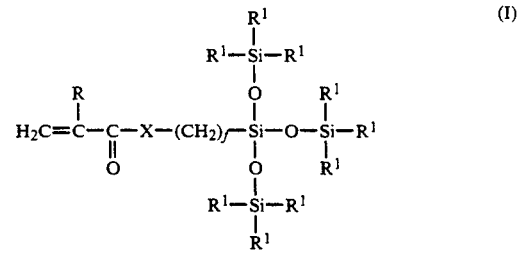

wherein:
 X denotes —O— or —NR—;
 each R independently denotes hydrogen or methyl;
 each $R^1$ independently denotes a lower alkyl radical or a phenyl radical; and
 f is 1 or 3 to 10.

Such bulky monomers include methacryloxypropyl tris(trimethylsiloxy)silane, pentamethyldisiloxanyl methylmethacrylate, tris(trimethylsiloxy) methacryloxy propylsilane, phenyltetramethyl-disiloxanylethyl acetate, and methyldi(trimethylsiloxy)methacryloxymethyl silane.

One preferred class of silicone-containing monomers is a poly(organosiloxane) prepolymer represented by formula (II):

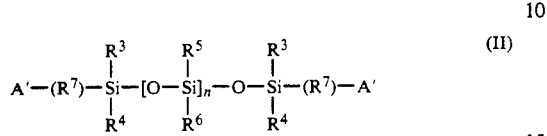

wherein:
  each A' independently denotes an activated unsaturated group, such as an ester or amide of an acrylic or a methacrylic acid;
  each of $R^3$, $R^4$, $R^5$ and $R^6$ are independently selected from the group consisting of a monovalent hydrocarbon radical or a halogen substituted monovalent hydrocarbon radical having 1 to 18 carbon atoms which may have ether linkages between carbon atoms;
  $R^7$ denotes a divalent hydrocarbon radical having from 1 to 22 carbon atoms; and
  n is 0 or an integer greater than or equal to 1.

Another preferred class of silicone containing monomers includes silicone-containing vinyl carbonate or vinyl carbamate monomers of formula (III):

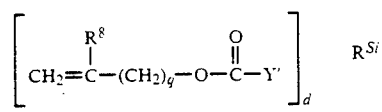

wherein:
  Y' denotes —O—, —S— or —NH—;
  $R^{Si}$ denotes a silicone-containing organic radical;
  $R^8$ denotes hydrogen or methyl;
  d is 1, 2, 3 or 4; and
  q is 0 or 1.

Suitable silicone-containing organic radicals $R^{Si}$ include the following:

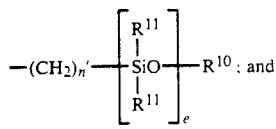

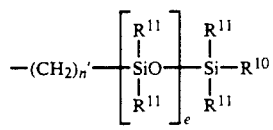

wherein:
  $R^{10}$ denotes

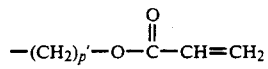

wherein p' is 1 to 6;
  $R^{11}$ denotes an alkyl radical or a fluoroalkyl radical having 1 to 6 carbon atoms;
  e is 1 to 200;
  n' is 1, 2, 3 or 4; and
  m' is 0, 1, 2, 3, 4 or 5.

The silicone-containing vinyl carbonate or vinyl carbamate monomers specifically include: 1,3-bis[4-vinyloxycarbonyloxy)but-1-yl]tetramethyl-disiloxane; 3-(trimethylsilyl)propyl vinyl carbonate; 3-(vinyloxycarbonylthio)propyl-[tris(trimethylsiloxy)silane]; 3-[tris(trimethylsiloxy)silyl] propyl vinyl carbamate; 3-[tris(trimethylsiloxy)silyl] propyl allyl carbamate; 3-[tris(trimethylsiloxy)silyl] propyl vinyl carbonate; t-butyldimethylsiloxyethyl vinyl carbonate; trimethylsilylethyl vinyl carbonate; trimethylsilylmethyl vinyl carbonate; and "V$_2$D$_{25}$",

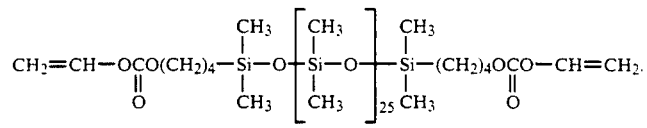

A further preferred class of silicone-containing monomers includes monomers of the following formulae:

IV (*D*A*D*G)$_a$*D*A*D*E'; or  (N)

(V) E(*D*G*D*A)$_a$*D*G*D*E';  (V)

wherein:
  D denotes an alkyl diradical, an alkyl cycloalkyl diradical, a cycloalkyl diradical, an aryl diradical or an alkylaryl diradical having 6 to 30 carbon atoms;
  G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;
  * denotes a urethane or ureido linkage;
  a is at least 1;
  A denotes a divalent polymeric radical of formula (VI):

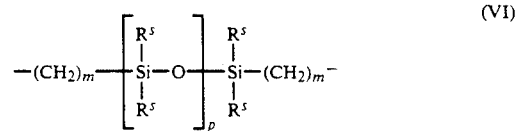

wherein:

$R^5$ independently denotes an alkyl or fluoro-substituted alkyl group having 1 to 10 carbon atoms which may contain ether linkages between carbon atoms;

m is at least 1; and p provides a moiety weight of 400 to 10,000;

each of E and E' independently denotes a polymerizable unsaturated organic radical represented by formula (VII):

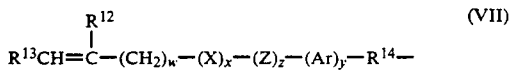

(VII)

wherein:

$R^{12}$ is hydrogen or methyl;

$R^{13}$ is hydrogen, an alkyl radical having 1 to 6 carbon atoms, or a —CO—Y—$R^{15}$ radical wherein Y is —O—, —S— or —NH—;

$R^{14}$ is a divalent alkylene radical having 1 to 10 carbon atoms;

$R^{15}$ is a alkyl radical having 1 to 12 carbon atoms;

X denotes —CO— or —OCO—;

Z denotes —O— or —NH—;

Ar denotes an aromatic radical having 6 to 30 carbon atoms;

w is 0 to 6;

x is 0 or 1;

y is 0 or 1; and z is 0 or 1.

A preferred urethane monomer is represented by formula (VIII):

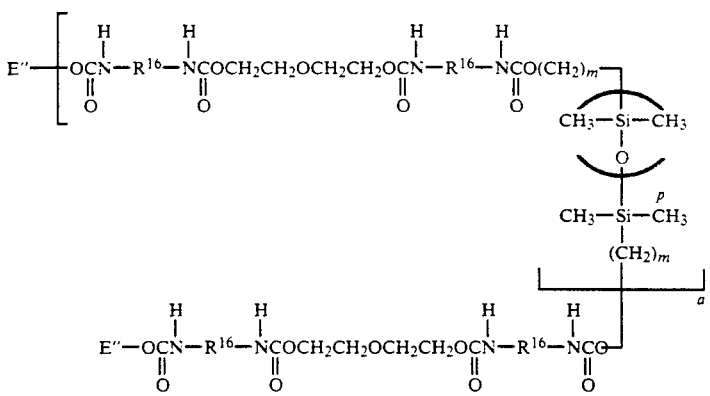

(VIII)

wherein $R^{16}$ is a diradical of a diisocyanate after removal of the isocyanate group, such as the diradical of isophorone diisocyanate, and each E" is a group represented by:

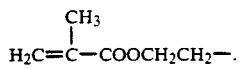

The silicone-containing monomers may be copolymerized with a wide variety of hydrophilic monomers to produce silicone hydrogel lenses. Suitable hydrophilic monomers include: unsaturated carboxylic acids, such as methacrylic and acrylic acids; acrylic substituted alcohols, such as 2-hydroxyethylmethacrylate and 2-hydroxyethylacrylate; vinyl lactams, such as N-vinyl pyrrolidone; and acrylamides, such as methacrylamide and N,N-dimethylacrylamide. Still further examples are the hydrophilic vinyl carbonate or vinyl carbamate monomers disclosed in U.S. Pat. Nos. 5,070,215, and the hydrophilic oxazolone monomers disclosed in U.S. Pat. No. 4,910,277. Other suitable hydrophilic monomers will be apparent to one skilled in the art.

An organic diluent is included in the initial monomeric mixture. As used herein, the term "organic diluent" encompasses organic compounds which minimize incompatibility of the components in the initial monomeric mixture and are substantially nonreactive with the components in the initial mixture. Additionally, the organic diluent serves to minimize phase separation of polymerized products produced by polymerization of the monomeric mixture. Also, the organic diluent will generally lower the glass transition temperature of the reacting polymeric mixture which allows for a more efficient curing process, and which ultimately results in a more uniformly polymerized product. Uniformity of the initial monomeric mixture and the polymerized product are of particular concern for silicone hydrogels primarily due to the inclusion of silicone-containing monomers.

Contemplated organic diluents include: monohydric alcohols, with $C_6$-$C_{10}$ straight-chained aliphatic monohydric alcohols, such as n-hexanol and n-nonanol, being especially preferred; diols, such as ethylene glycol; polyols, such as glycerin; ethers, such as diethylene glycol monoethyl ether; ketones, such as methyl ethyl ketone; esters, such as methyl enanthate; and hydrocarbons, such as toluene. Preferably, the organic diluent is sufficiently volatile to facilitate its removal from a cured article by evaporation at or near ambient pressure. Other suitable organic diluents would be apparent to a person of ordinary skill in the art.

The organic diluent is included in an amount effective to provide the desired effect. Generally, the diluent is included at 5 to 60% by weight of the monomeric mixture, with 10 to 50% by weight being especially preferred.

According to the present process, the monomeric mixture, comprising at least one hydrophilic monomer, at least one silicone-containing monomer and the organic diluent, is cured by conventional methods such as static casting or spincasting.

Subsequently, a sufficient amount of organic diluent is removed from the cured article to improve the machineability of the article. Applicants discovered that although the inclusion of the organic diluent can minimize the aforementioned problems associated with monomer incompatibility, phase separation or nonuniform polymerization, excess residual diluent can render normally soft silicone hydrogel articles even tackier or more rubbery and more difficult to machine; in fact, machining of the cured article may be precluded altogether. Surprisingly, the process according to the present process provides removal of organic diluent from the cured article without deformation of the article, such as warping of the lens.

The organic diluent is preferably removed by evaporation at or near ambient pressure, and an elevated temperature can be employed to shorten the time necessary to evaporate the diluent. The time, temperature and pressure conditions for the removal step will vary depending on such factors as the volatility of the diluent and the specific monomeric components, as can be readily determined by one skilled in the art. According to a preferred embodiment, the temperature employed in the removal step is at least 50° C., and more preferably, at least 55° C. Preferably, the cured article after the diluent removal step will contain no more than 20% by weight of diluent, and preferably, no more than 5% by weight.

Following removal of the organic diluent, the shaped article is machined by various processes known in the art. The machining step includes lathe cutting a lens surface, lathe cutting a lens edge, buffing a lens edge or polishing a lens edge or surface. The present process is particularly advantageous for processes wherein a lens surface is lathe cut, since machining of a lens surface is especially difficult when the surface is tacky or rubbery.

Generally, such machining processes are performed before the article is released from a mold part. After the machining operation, the lens can be released from the mold part and hydrated. Alternately, the article can be machined after removal from the mold part and then hydrated.

Representative formulations are listed below.

| Component | Parts by Weight |
| --- | --- |
| FORMULATION A | |
| TRIS-VC | 55 |
| NVP | 30 |
| V$_2$D$_{25}$ | 15 |
| VINAL | 1 |
| n-nonanol | 15 |
| Darocur | 0.2 |
| tint agent | 0.05 |

| Component | Parts by Weight (or Weight Percent) |
| --- | --- |
| FORMULATION B | |
| IDS3H | 35 |
| Tris | 35 |
| DMA | 39 |
| MAA | 1 |
| n-hexanol | 40 |
| TXN | 0.1% |
| MDEA | 0.2% |
| tint agent | 0.007% |
| FORMULATION C | |
| IDS3H | 30 |
| Tris | 30 |
| NVP | 27 |
| DMA | 9 |
| VDMO | 1 |
| HEMAvc | 0.15 |
| n-hexanol | 30 |
| Darocur | 0.5% |
| tint agent | 0.03% |
| FORMULATION D | |
| IDS3H | 30 |
| Tris | 30 |
| NVP | 27 |
| DMA | 9 |
| VDMO | 1 |
| HEMAvc | 0.15 |
| n-nonanol | 30 |
| Darocur | 0.5% |
| tint agent | 0.03% |
| FORMULATION E | |
| IDS3H | 35 |
| Tris | 35 |
| DMA | 48 |
| MAA | 1 |
| n-hexanol | 40 |
| TXN | 0.1% |
| MDEA | 0.2% |
| tint agent | 0.007% |

The following materials are designated above.

| | |
| --- | --- |
| Darocur | Darocur-1173, a UV initiator |
| DMA | N,N-dimethylacrylamide |
| HEMAvc | methacryloxyethyl vinyl carbonate |
| IDS3H | a urethane prepolymer derived from isophorone diisocyanate, diethylene glycol and alpha,omega-bis(hydroxybutyldimethylsilyl) polysiloxane and end-capped with 2-hydroxyethy methacrylate (described in U.S. Pat. No. 5,034,461) |
| MAA | methacrylic acid |
| MDEA | methyl diethanolamine |
| NVP | N-vinyl pyrrolidone |
| tint agent | 1,4-bis[4-(2-methacryloxyethyl)phenylamino] anthraquinone |
| TRIS | tris(trimethylsiloxy)silylpropyl methacrylate |
| TRIS-VC | tris(trimethylsiloxy)silylpropyl vinyl carbamate |
| TXN | thioxanthone |
| V$_2$D$_{25}$ | a silicone-containing vinyl carbonate as previously described |
| VDMO | 2-vinyl-4,4-dimethyl-2-oxazoline-5-one |
| VINAL | N-vinyloxycarbonyl alanine |

The following examples further illustrate preferred embodiments of the present invention.

EXAMPLE 1

Under an inert nitrogen atmosphere, 20-$\mu$l of Formulation A was injected onto a clean open concave mold made of Barex resin (a rubber modified copolymer of acrylonitrile and methylacrylate). The mold was spun for about 5 minutes at 320 rpm in the presence of UV light (1-2.5 mW/cm2 as measured by Black ray UV meter) and exposed to UV light for about 30 additional minutes to complete the cure.

The lenses were maintained at 60° C. for 3 hours in a forced air oven to remove n-nonanol. Subsequently, the lenses were edged and ball buffed at 1000 rpm for 6 seconds with a force of 25 g while still in the mold. The lenses were manually released from the molds in water at 50° C., and extracted in isopropanol at room temperature for a minimum of 48 hours. The lenses were then extracted with water at about 85° C. for four hours. Finally, the lenses were autoclaved in vials containing buffered saline.

EXAMPLE 2

Under an inert nitrogen atmosphere, 30-$\mu$l of Formulation B was injected onto a clean open concave Barex resin mold. The mold was spun for about 15 minutes at 341 rpm in the presence of UV light (1-2.5 mW/cm$^2$ as measured by Black ray UV meter) and exposed to UV light for about 30 additional minutes to complete the cure.

The lenses were left overnight at room temperature to remove n-hexanol. Subsequently, the lenses were edged and ball buffed at 1000 rpm for 3 seconds with a force of 130 g while still in the mold. The lenses were released from the molds in an ethanol/water medium, extracted in ethanol at room temperature for a minimum of 48 hours, and then extracted with water at 80° C. for 4 hours. Finally, the lenses were cleaned and heat disinfected using unpreserved buffered saline.

EXAMPLE 3

Under an inert nitrogen atmosphere, 45-µl of Formulation C was injected onto a clean Barex resin concave mold half and covered with a polypropylene resin convex mold half. The mold halves were compressed at a pressure of 70 psi and the mixture was cured for about 15 minutes in the presence of UV light (6–11 mW/cm2 as measured by Spectronic UV meter), and the mold was exposed to UV light for about 5 additional minutes.

The top mold half was removed and the lenses were maintained at 60° C. for 3 hours in a forced air oven to remove n-hexanol. Subsequently, the lens edges were lathe cut and ball buffed for 10 seconds at 2300 rpm with a force of 60 g. The lenses were manually released from the molds in water at 50° C., and then extracted in isopropanol at room temperature for a minimum of 48 hours, followed by extraction in water at about 85° C. for 4 hours. Finally, the lenses were disinfected using unpreserved buffered saline.

EXAMPLE 4

Under an inert nitrogen atmosphere, 80-µl of Formulation C was injected onto a clean open concave Barex resin mold. The mold was spun for about 20 minutes at 400 rpm in the presence of UV light (6–10 mW/cm$^2$ as measured by Spectronic UV meter) and exposed to UV light for about 12 additional minutes.

The shaped articles were maintained at 60° C. for hours in a forced air oven to remove n-hexanol. Subsequently, the posterior surfaces of the articles were lathe cut, then the lenses were polished for 30 seconds. The lenses were manually released from the molds in water at 50° C., extracted in isopropanol for a minimum of 48 hours, followed by extraction in water at about 85° C. for 4 hours. Finally, the lenses were autoclaved in buffered saline.

EXAMPLE 5

The procedure of Example 4 was followed except that Formulation D, including 30 parts by weight of n-nonanol, was employed in place of Formulation C.

EXAMPLE 6

Each of Formulations X-1, X-2 and X-3 (containing n-hexanol at 10, 15 and 20 parts by weight, respectively) were static cast in flat polypropylene disc molds and cured with UV light. The cured flat discs were inspected. The discs cast from Formulations X-2 and X-3, which contained 15 and 20 parts by weight of n-hexanol, respectively, appeared too tacky to permit machining of the edges due to excess residual n-hexanol, whereas the discs cast from Formulation X-1, which contained only 10 parts by weight of n-hexanol, appeared non-tacky.

| FORMULATIONS X-1, X-2, X-3 | |
|---|---|
| Component | Parts by Weight (or Weight Percent) |
| IDS3H | 35 |
| Tris | 35 |
| DMA | 30 |
| n-hexanol | 10, 15, 20 |
| BME* | 0.2% |

*BME benzoin methyl ether, a UV initiator

EXAMPLE 7

Lenses were spincast from Formulation A (containing 15 parts by weight n-nonanol) following the procedure of Example 1. The spincast lenses, remaining in the mold, were placed in a forced air oven maintained at temperatures of 50° C., 55° C. and 60° C.

For the lenses dried at 55° C. and 60° C., two lenses, remaining in the mold, were removed from the oven at each interval of 0 (control), 1, 2, 3, 4, 5, 6 and 24 hours, and extracted with 2 ml of isopropanol for a minimum of 12 hours. For the lenses dried at 50° C., two lenses, remaining in the mold, were removed at each interval of Q (control), 1, 6 and 24 hours, and each sample was extracted with 2 ml of isopropanol for a minimum of 12 hours. Samples of each isopropanol extract (0.1 µl) were obtained and subjected to capillary gas chromatography to determine n-nonanol content.

The percentage of n-nonanol in the samples, based on the control, was less than 5% after a drying time of 2 hours at 55° C. and 60° C. and after a drying time of 6 hours at 50° C.

EXAMPLE 8

Lenses were again spincast from Formulation A (containing 15 parts by weight n-nonanol) following the procedure of Example 1. The spincast lenses, remaining in the mold, were placed in a forced air oven maintained at a temperature of 55° C. Ten molds were removed at each interval of 1, 2, 3, 4, 5 and 6 hours and 24 hours (as a control), and the lenses were edged following the procedure of Example 1.

The edges of lenses that were maintained at 55° C. for 1 hour appeared rough and chipped after edging, whereas the lenses that were maintained at 55° C. for 24 hours could be edged satisfactorily. The lenses that exhibited poor edging contained excess residual n-nonanol in the lenses. Each of the lenses that were maintained at 55° C. for 2 hours or longer edged comparatively with the lenses maintained at 55° C. for 24 hours. Accordingly, sufficient diluent was removed from the spincast lenses to machine edge the lenses by maintaining the lenses at 55° C. for at least 2 hours. Based on the data from Example 7, removal of n-nonanol to below 5% was sufficient to provide satisfactory edging.

While certain preferred embodiments have been described, it is understood that the invention is not limited thereto and modifications and variations would be evident to a person of ordinary skill in the art.

We claim:

1. A process for preparing silicone hydrogel contact lenses, said process comprising:
    (a) providing a monomeric mixture comprising a silicone-containing monomer, a hydrophilic monomer and an organic diluent;

(b) charging the monomeric mixture to a mold and curing the formulation in the mold to obtain a shaped article;
(c) removing diluent from the shaped article to improve machineability of the shaped article; and
(d) machining the shaped article to obtain a contact lens having a desired configuration.

2. The process according to claim 1, wherein the monomeric mixture is charged to a mold comprising a first mold section including a surface for forming an anterior lens surface and a second mold section including a surface for forming a posterior lens surface.

3. The process according to claim 1, wherein the monomeric mixture is cured by spincasting.

4. The process according to claim 1, wherein step (d) comprises machining a lens surface to a desired configuration.

5. The process according to claim 4, wherein the machining comprises lathe cutting a posterior lens surface.

6. The process according to claim 4, wherein the machining comprises lathe cutting an anterior lens surface.

7. The process according to claim 4, wherein the machining comprises polishing a lens surface.

8. The process according to claim 1, wherein step (d) comprises machining an edge of a lens-shaped article to a desired edge configuration.

9. The process according to claim 8, wherein the machining comprises lathe cutting the edge.

10. The process according to claim 8, wherein the machining comprises buffing the edge.

11. The process according to claim 1, comprising:
(a) providing said monomeric mixture;
(b) charging an excess of said mixture to a mold including a concave surface for forming a desired anterior lens surface and spincast curing the formulation in the mold to obtain a shaped article having the desired anterior lens surface;
(c) removing diluent from the shaped article to improve machineability of the article; and
(d) lathe cutting the posterior surface of the article to obtain a contact lens with a desired thickness.

12. The process according to claim 1, comprising:
(a) providing said monomeric mixture;
(b) charging said monomeric mixture to a mold, wherein said mold comprises a first mold section including a surface for forming an anterior lens surface and a second mold section including a surface for forming a posterior lens surface, and curing said formulation in the mold to obtain a lens-shaped article having the anterior and posterior lens surfaces;
(c) removing diluent to improve machineability of the article; and
(d) machining the edge of the article to obtain a contact lens with a desired edge configuration.

13. The process according to claim 1, comprising:
(a) providing said monomeric mixture;
(b) charging said monomeric mixture to a mold including a negative molding surface for forming a desired anterior lens surface and spincast curing the monomeric mixture in the mold to obtain a lens-shaped article having the desired anterior lens surface and a desired posterior lens surface;
(c) removing diluent to improve machineability of the article; and
(d) machining the edge of the article to obtain a contact lens with a desired edge configuration.

14. The process according to claim 1, further comprising hydrating the lens obtained from step (d).

15. The process according to claim 1, wherein the organic diluent is an alcohol.

16. The process according to claim 15, wherein the organic diluent is selected from the group consisting of n-hexanol and n-nonanol.

17. The process according to claim 15, wherein step (c) comprises drying the shaped article at an elevated temperature.

18. The process according to claim 17, wherein the shaped article is maintained at a temperature of at least 50° C. for at least 2 hours.

19. The process according to claim 1, wherein the silicone-containing monomer is selected from the group consisting of silicone-containing vinyl carbonate prepolymers and silicone-containing vinyl carbamate prepolymers.

20. The process according to claim 1, wherein the silicone-containing monomer is a silicone-containing urethane prepolymer.

* * * * *

UNITED STATES PATENT AND TRADEMARK OFFICE
CERTIFICATE OF CORRECTION

PATENT NO. : 5,260,000
DATED : November 9, 1993
INVENTOR(S) : Mahenda P. Nandu, et al It is certified that error appears in the above-indentified patent and that said Letters Patent is hereby corrected as shown below:

"In column 4, line 44 change "IV(*D*A*D*G)$_a$*D*A*D*E'; or  (N)" to --E(*D*A*D*G)$_a$*D*A*D*E'; or  (IV)--.".

"In column 4, line 45, change "(V)E(*D*G*D*A)$_a$*D*G*D*E';" to --E(*D*G*D*A)$_a$*D*G*D*E';  (V)--.".

In column 5, line 1, add --each-- before the word "R".
In column 9, line 43, add -- 3 -- before the word "hours".

Signed and Sealed this

Twenty-fourth Day of May, 1994

BRUCE LEHMAN

Attest:

Attesting Officer  Commissioner of Patents and Trademarks